Sept. 28, 1965  J. J. McDERMOTT  3,208,433
ELECTRIC ANIMAL GATE
Filed May 1, 1964
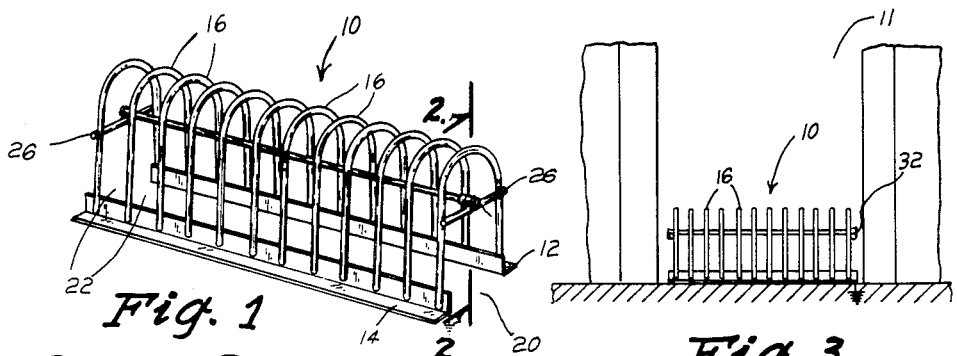
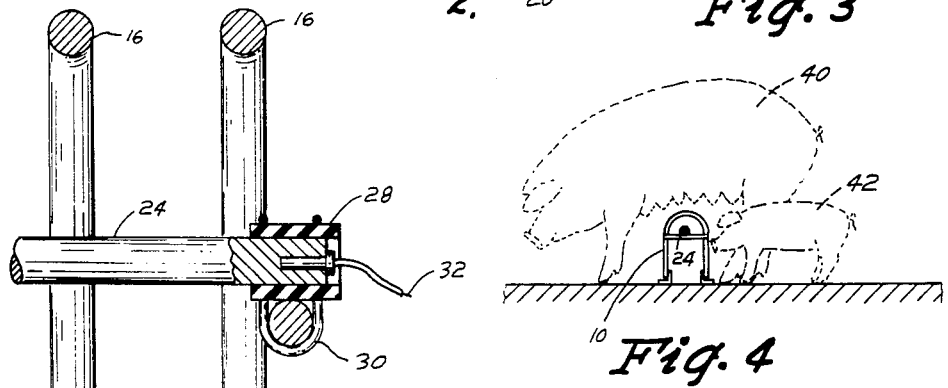
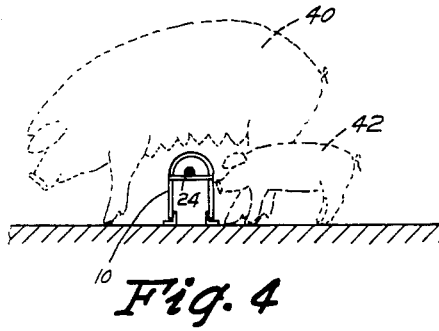
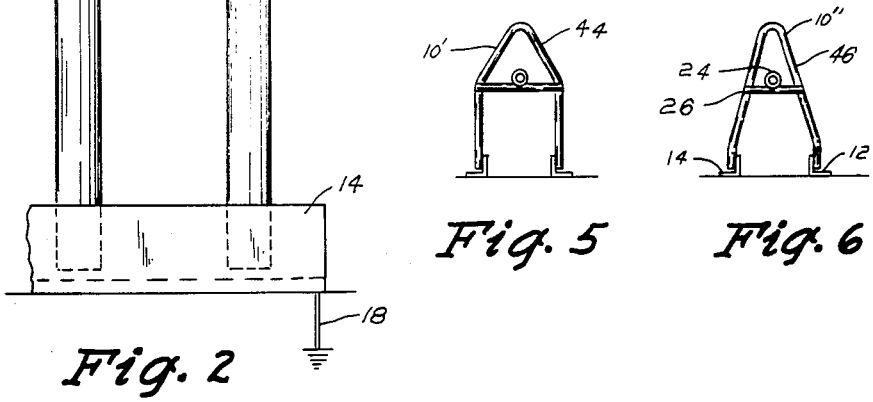
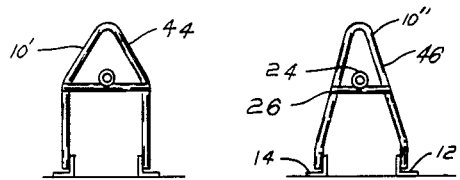
INVENTOR
JOHN J. McDERMOTT
BY
Dick & Zarley
ATTORNEYS

United States Patent Office 3,208,433
Patented Sept. 28, 1965

3,208,433
ELECTRIC ANIMAL GATE
John J. McDermott, Epworth, Iowa
Filed May 1, 1964, Ser. No. 364,107
9 Claims. (Cl. 119—155)

This invention relates to an electric animal gate for closing a doorway or the like to certain animals while permitting other animals to pass therethrough. Frequently it is desired to restrict small pigs or the like to a limited area without so restricting the sow.

It is therefore an object of this invention to provide a gate which will permit passage through a doorway or the like of large animals while closing the doorway to small animals.

It is an object of this invention to provide a gate that may be placed in a doorway or the like which only large animals can step over.

It is still a further object of this invention to provide a gate for doorways or the like which is electrically connected to an electric fence controller.

Another object of this invention is to provide an electric gate for placing in passageways or the like which is connected to an electric fence controller and includes a pair of electrodes which may be electrically interconnected on being contacted by an animal or the like.

A related object of this invention is to provide an electric gate connected to an electric fence controller which has one electrode protected by guard means thereby preventing large animals from being shocked upon contacting the gate and conversely so shaped that small animals contacting the electrode will receive an electrical shock.

Thus another object of this invention is to provide an electric gate for positioning in gateways or the like wherein certain animals upon contacting separate electrodes of the gate will complete the electrical circuit to the electric fence controller and thereby receive a shock.

A further object of this invention is to provide an electric animal gate which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of the electric animal gate of this invention;

FIG. 2 is a fragmentary side elevation view taken along line 2—2 in FIG. 1 showing in particular the center electrode supported and secured to outer guard electrode members;

FIG. 3 is a side elevation view of the electric gate of FIG. 1 but positioned in a doorway or the like;

FIG. 4 is an end elevation view of the electric gate of FIG. 1 showing in particular a large animal such as a sow moving over the gate while a smaller animal, a pig is stopped;

FIG. 5 is an end elevation view of an alternate embodiment of the electric gate of FIG. 1 wherein the upper ends of the guard members are V-shaped; and FIG. 6 is a second alternate embodiment of the electric gate of FIG. 1 wherein the guard members are V-shaped.

The electric gate of this invention is referred to generally in FIGS. 1 and 3 by the reference numeral 10 and is shown positioned in a doorway 11 in FIG. 3. The gate unit 10 includes a pair of elongated angle frame members 12 and 14 connecting opposite free ends of a plurality of inverted U-shaped guard members 16. Since the frame members 12 and 14 are of metallic material and the guard members 16 are preferably of a metal rod construction, an electrical circuit throughout all of the guard members is formed. As shown in FIGS. 2 and 3, the frame member 14 is connected to the ground by a lead 18.

The guard members 16 as secured to the frame members 12 and 14 define an elongated passageway 20 which extends between each of the legs of each U-shaped guard member. Also, transverse openings 22 between the legs of adjacent guard members 16 are presented which provide access to the center elongated passageway 20.

A second electrode is provided in the electric gate in the form of an elongated rod 24 which extends the length of the gate unit 10 in the passageway 20 and is secured to the respective end guard members 16 by transversely extending support members 26.

Electrical insulation material such as rubber or the like 28 is provided between the clamping means 30 as shown in FIG. 2 for securing the rod electrode 24 to the support members 26. At one end of the electrode 24, a lead wire 32 is provided and is adapted to be connected to a terminal on an electric fence controller.

Thus it is seen that in operation that an electrical circuit may be completed through the external electric fence controller by connecting one of the guard members 16 to the center elongated electrode 24. Also, a circuit completed between the electrode 24 and the supporting ground surface would complete the electrical circuit through the electric fence. Accordingly should an animal make this connection between the guard members 16 and the center electrode 24, it would receive an electrical shock such as presented by the conventional electric fence.

However, as illustrated in FIG. 4, the larger animals such as a sow 40 are able to pass over the electric fence gate unit 10 and by appropriate spacing of the guard members 16 the larger animals are prevented from contacting the center electrode 24. On the other hand, the smaller animals such as the pig 42 is not only able to touch the center electrode 24 by his nose or feet and at the same time contact the guards 16 but will almost necessarily do so in crossing over the electric gate 10. Thus, the pig will learn that he will receive an electrical shock if he attempts to cross the electrical gate unit 10 and consequently will not attempt to cross over it.

In FIG. 5 an electric gate unit 10' is shown which is similar in construction to the gate unit 10 in FIG. 1 except that the upper ends of the guard members 16 are V-shaped as indicated at 44. In FIG. 6 a third embodiment is illustrated wherein the gate unit 10'' is comprised of a plurality of guard members 46 which are V-shaped throughout their entire length except where connected to frame base members 12 and 14. It is apparent that various shapes are contemplated for the guard members as indicated by the U-shaped guard members 16 in FIGS. 1 through 3, the V-shaped top portion guard member 44 in FIG. 5 and the guard member 46 which is V-shaped throughout its entire length as illustrated in FIG. 6.

Some changes may be made in the construction and arrangement of my electric animal gate without departing from the real spirit and purpose of my invention, and it is my intention to cover by my claims, any modified forms of structure or use of mechanical equivalents which may be reasonably included within their scope.

I claim:
1. An electric animal gate, comprising,
two spaced apart rows of upstanding guard members, said rows of upstanding guard members defining an elongated passageway therebetween, said guard members in each of said rows of guard members being spaced apart to form access openings to said passageway, an elongated electrical conductor member disposed in said passageway and extending longitudinally thereof in spaced relation to said guard members, and said elongated electrical conductor adapted to be charged by being connected to an electrical power supply.

2. The electric animal gate of claim 1 wherein said guard members in one of said rows and adjacent guard members in the other of said rows are interconnected at their upper free ends to form a series of inverted substantially U-shaped guard members.

3. The electric animal gate of claim 1 wherein said guard members are substantially rigid to maintain them in spaced relation to said elongated electrical conductor upon pressure being applied to said guard members.

4. The electric animal gate of claim 1 wherein said guard members are formed of electrically conductive material and are interconnected to form a unitary conductive structure in spaced relation to said elongated electrical conductor.

5. The electric animal gate of claim 1 wherein said guard members are formed of electrically conductive material and are interconnected to form a unitary conductive structure in spaced relation to said elongated electrical conductor and electrical means for connecting said unitary conductive structure to the ground and thereby be adapted to form an electrical circuit with an electrical power supply connected to the ground.

6. The electric animal gate of claim 1 wherein said guard members are formed of electrically conductive material and are interconnected to form a unitary conductive structure in spaced relation to said elongated electrical conductor and support means extending between adjacent guard members in each of said rows of guard members, said elongated electrical conductor member supported by said support means, insulative means provided between said unitary guard conductive structure and said elongated electrical conductor, and conductive means connected to said unitary guard structure for connecting said guard structure to the ground and thereby be adapted to form an electrical circuit with an electrical power supply connected to the ground.

7. The electric animal gate of claim 1 wherein said guard members are formed of electrically conductive material and are interconnected to form a unitary rigid conductive structure in spaced relation to said elongated electrical conductor.

8. The electric animal gate of claim 1 wherein said guard members in one of said rows and adjacent guard members in the other of said rows are interconnected at their upper free ends to form a series of inverted substantially V-shaped guard members.

9. An electric animal gate, comprising, an elongated frame adapted to be positioned on the supporting surface of a doorway or the like, a plurality of rigid spaced apart upstanding guard members being substantially an inverted U in shape disposed on said frame and along its length, said inverted substantially U-shaped guard members defining an elongated passageway having an axis extending perpendicularly to the plane of each of said guard members, an elongated electrode being longitudinally disposed in said passageway in spaced relation to said guard members, and said inverted substantially U-shaped guard members being so arranged that adjacent guard members define access openings therebetween for access to said elongated electrode by the feet of pigs or the like.

References Cited by the Examiner

UNITED STATES PATENTS

| | | | |
|---|---|---|---|
| 654,190 | 7/00 | Thompson | 119—155 |
| 2,023,835 | 12/35 | Heiken | 256—10 |
| 2,376,630 | 5/45 | Stentz | 119—155 |

SAMUEL KOREN, *Primary Examiner.*

HUGH R. CHAMBLEE, *Examiner.*